Patented Dec. 29, 1942

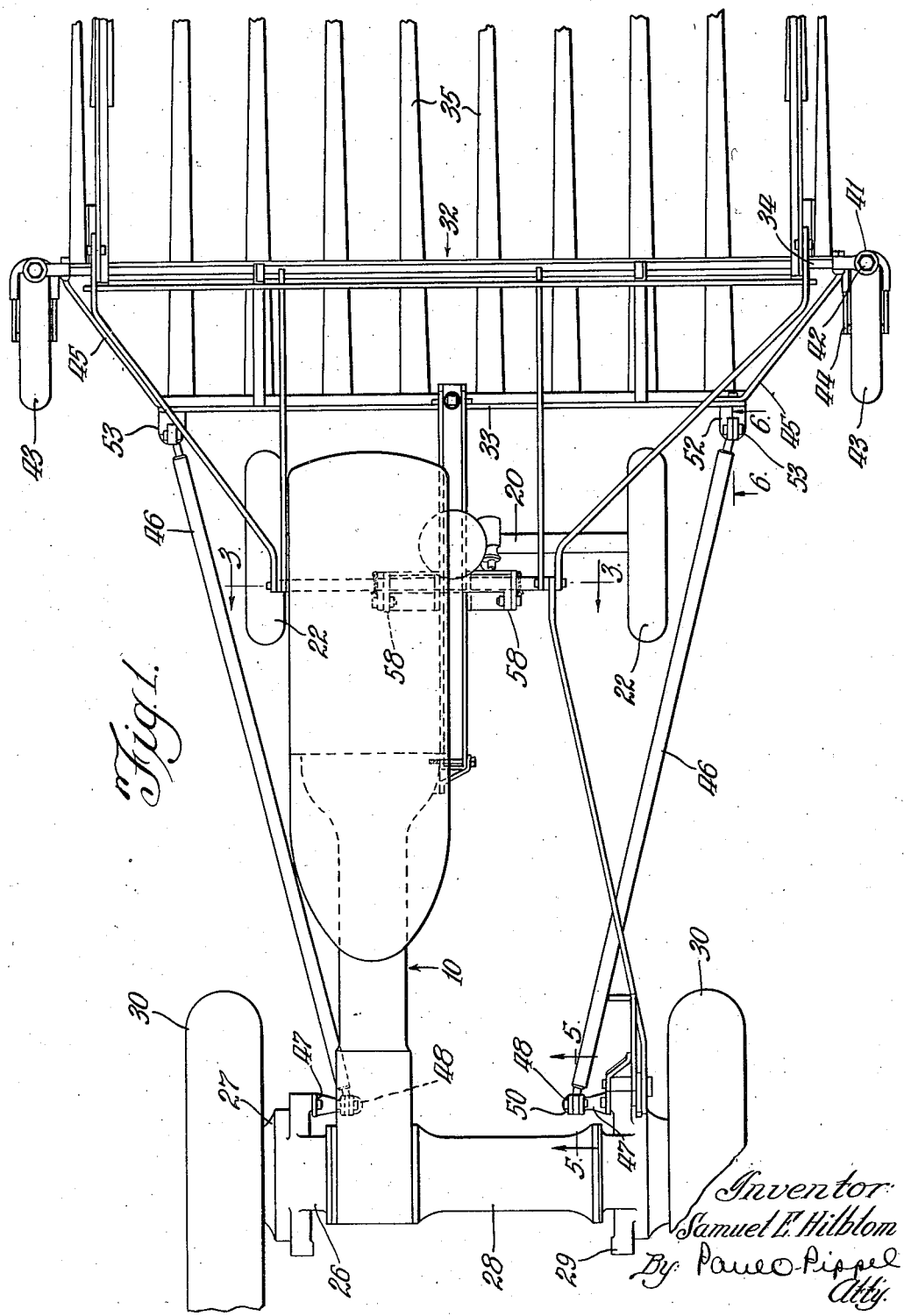

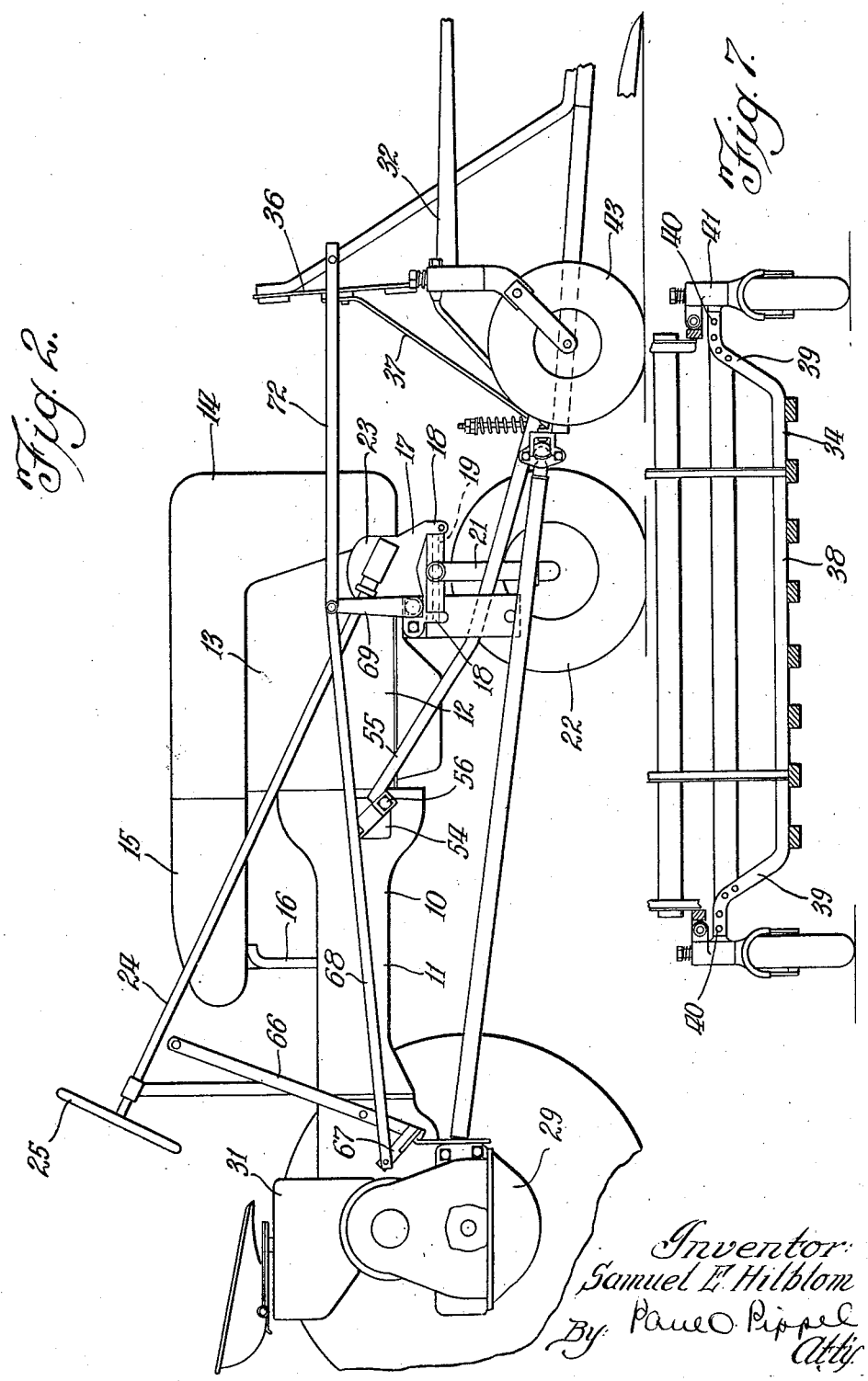

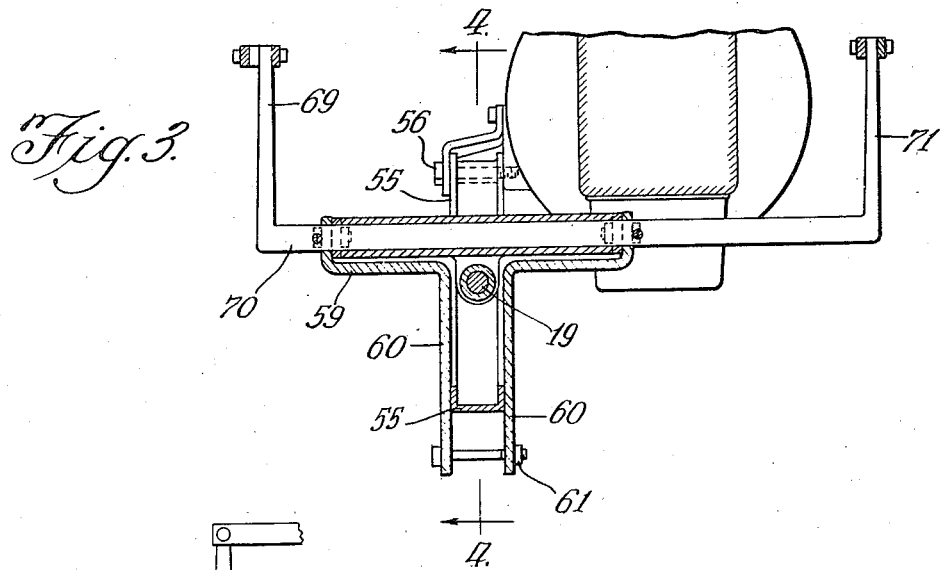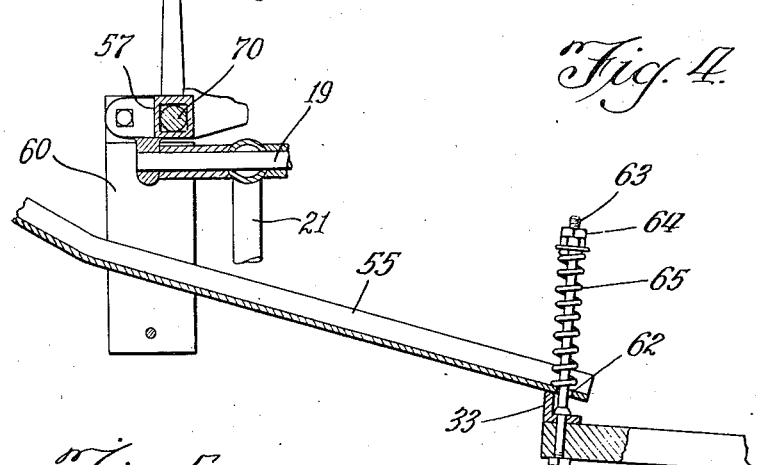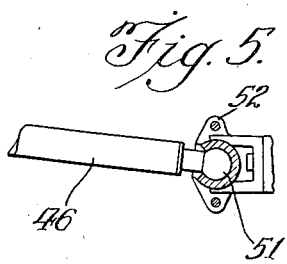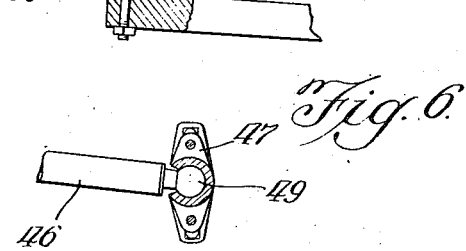

2,306,803

UNITED STATES PATENT OFFICE 2,306,803

TRACTOR LOAD-MOVING MACHINE

Samuel E. Hilblom, Chicago, Ill., assignor to International Harvester Company, a corporation of New Jersey Application August 8, 1941, Serial No. 405,982

10 Claims. (Cl. 56—27)

This invention relates to a vehicle-mounted implement or machine and, particularly, to a machine of the load-moving or load-carrying type. Specifically, the invention pertains to a tractor-mounted sweep rake.

For the purposes of clarifying the explanation of the underlying principles of the present invention, reference will be had to a tractor-mounted sweep rake, although it will be understood that machines and implements of other types are similarly embraced within the scope of the invention.

A tractor sweep rake of usual construction comprises a combined tractor and rake head, the rake head being disposed ahead of the tractor and having rake teeth adapted to engage the hay or other material being gathered by the machine. In one type of rake, the rake head is supported on the front end of the tractor. In another type of rake, the rake head is carried on ground supports in the form of transversely spaced wheels independently of the tractor. The present invention is concerned with improvements in rakes of both classes, but primarily with machines of the latter class.

The principal object of the present invention is to provide an improved vehicle-connected load-moving device or machine comprising a vehicle and load-carrying means, and to provide an improved structure for the mounting of the load-carrying means on the vehicle.

An important object of the invention is to provide an improved load-carrying means supported at the front of the vehicle on independent ground supports and to connect said means to the tractor so that the means and tractor may have relative vertical movement as the ground supports and wheels of the tractor adapt themselves to varying ground contour.

Another object is to provide in a sweep rake or similar machine a rake head or load-carrying frame which is mounted for tilting on a transverse axis drawn through a pair of wheels or the like which support the head.

Another object is to provide means for yieldably resisting the tilting movement of the head about the axis through the wheels.

Still another object is to provide load-transmitting means including universal coupling means, so that the rake head and tractor may have relatively free movement with respect to each other.

Another object is to provide means for limiting to a certain extent the relative movement between the rake head and tractor.

Still another object is to combine the aforesaid means and the means for resisting the tilting of the rake head.

Still another object is to provide an improved means for moving the rake head or similar load-carrying frame between raised and ground-engaging positions.

Still another object of the invention is to provide an improved load-carrying structure, such as a rake head for a sweep rake.

And still another object is to provide an improved sweep rake mounting for a tractor of the type in which the longitudinal body is laterally offset with respect to the longitudinal center line through the tractor axles.

A more complete understanding of the foregoing and other objects and features of the invention may be had from the following detailed description of one form of the invention as illustrated in the accompanying sheets of drawings, in which:

Figure 1 is a plan view of a tractor-mounted sweep rake constructed according to the invention;

Figure 2 is a side elevational view of the same;

Figure 3 is an enlarged transverse sectional view, taken substantially on the line 3—3 of Figure 1;

Figure 4 is a sectional view taken on the line 4—4 of Figure 3;

Figures 5 and 6 are enlarged sectional views showing the front and rear universal coupling means, taken on the lines 6—6 and 5—5, respectively, of Figure 1; and, Figure 7 is a front view on a reduced scale showing the rake head construction and the mounting of the supporting wheels thereon.

The tractor chosen for the purposes of illustration is of the type in which the tractor body is laterally offset with respect to a longitudinal center line through the axles of the front and rear wheels. Such a tractor is shown in the patent to Johnston et al., 2,221,546, November 12, 1940. It is to be understood, however, that the invention in its broader aspects is applicable to tractors or vehicles of other types. It is only in its specific phases that the present invention pertains to the mounting of a load-carrying structure on the tractor of the offset type referred to above.

As shown in Figures 1 and 2, the vehicle or tractor includes a main longitudinal body 10 comprising a rear body part 11 and a front body part 12, the latter consisting of an engine or power plant 13 covered by a grill and hood structure 14. A fuel tank 15 forms a continuation of the hood structure 14 and is supported by a bracket 16 on the rear body part 11. The forward end of the front body part 12 includes an axle-supporting structure 17 having longitudinally spaced depending ears 18 through which is passed a longitudinally extending pivot pin 19. This pin carries a transverse axle 20, at opposite ends of which are provided vertical standards 21. The lower end of each standard provides a stub axle on which is journaled a wheel 22. The axle-supporting structure 17 includes further a housing 23. This housing contains gearing, not shown, which is operated by a steering rod 24 and steering wheel 25 for steering the front wheels 22. The front wheels are steerable after the fashion of the steerable wheels of an automobile, certain detail parts of the construction having been omitted as unnecessary to a description of the present invention.

The rear body part 11 of the tractor carries at one side thereof a relatively short axle housing 26 terminating at its lower portion in a depending gear housing 27. The other side of the rear body part 11 is connected to a relatively long axle housing 28 which in turn carries at its outer end a depending gear housing 29. Drive wheels 30 are mounted on stub axles in the housings 26 and 29. It will be seen from an examination of Figure 1 that the left-hand front wheel 22 and the left-hand rear wheel 30 are closer to the side of the body 10 than are the wheels at the other side of the tractor. In other words, the longitudinal center line through the body 10 is laterally offset from a longitudinal center line drawn through the front and rear axles. The center line through the axles is coincident with the axis of the pivot pin 19, which has been previously described as the means by which the axle structure 20 is pivotally supported on the structure 17 at the forward end of the tractor body. An operator's station 31 is disposed at the rear end of the body 10, just rearwardly of the steering wheel 25.

For the purposes of the present disclosure of the invention there has been illustrated and will be described a wheel-supported sweep rake connected to the tractor. It will be understood, however, that other forms of load-moving or load-carrying machines and other implements are included within the class to which the presently illustrated embodiment of the invention belongs.

The sweep rake includes a rake head, generally indicated at 32, disposed at the forward end of the tractor ahead of the tractor front wheels 22. As best shown in Figure 1, the rake head is provided with a transverse rear frame member or bar 33 and a parallel forward frame member or bar 34. These bars are rigidly interconnected by a plurality of transversely spaced, longitudinally extending rake teeth 35. The rake head further includes an upstanding rack structure 36 carried at its lower end by the front frame bar 34 and braced by a plurality of transversely spaced brace means 37 connected between the upper end of the rack structure and the rear frame bar 33.

As best shown in Figure 7, the front frame bar 34 has an intermediate, horizontal portion 38 extending transversely across the rake head at a comparatively low level as respects the ground. Opposite ends of the portion 38 are turned upwardly, as at 39, to provide a pair of laterally extending supporting portions 40 disposed at a comparatively higher level. Each of the portions 40 rigidly carries a bracket having a vertically extending sleeve 41 which journals a vertical spindle 42 of a ground support in the form of a caster wheel 43. A yoke or fork 44 connects the spindle 42 and the caster wheel axle. Each wheel structure is thus mounted for swiveling movement about the vertical axis of the spindle 42. These wheels carry the rake head independently of the tractor; that is, the tractor carries none of the weight of the rake head. Because of this arrangement, the rake head is mounted for tilting movement upwardly and downwardly about a transverse axis generally through the wheels 43, and the forward ends of the rake teeth 35 may be tilted from a ground-engaging position, as shown in Figure 2, to a raised or transport position, all of which will be hereinafter more fully described.

The outer end portions 40 of the transverse front frame bar 34 of the rake head 32 are connected respectively to the outer ends of the rear frame bar 33 by downwardly, inwardly, and rearwardly extending brace members 45. As best shown in Figure 1, these members are so arranged as to be out of the path of the wheels 43 when those wheels swivel about the vertical axes of the spindles 42. Thus the wheels are enabled to have free swiveling movement without interference from parts of the rake-head structure.

According to the present invention, an improved means is provided for connecting the load-moving or load-carrying frame, such as the rake head 32, and the tractor. This means preferably includes a pair of transversely spaced, longitudinally extending frame elements in the form of pusher bars 46. Each of the depending housings 27 and 29 of the tractor is provided with a bracket structure 47 including a universal coupling in the form of a ball and socket joint 48. Each ball and socket joint is formed by the provision of a ball 49 on the rear end of the respective pusher bar 46 and a cap member 50 which is complementary to a socket formed in the respective bracket 47. This structure is best illustrated in Figure 6. The forward end of each pusher bar 46 is provided with a ball 51. One half of a socket is provided in a bracket 52 carried at an outer end of the rear member 33 of the rake head. A complementary cap member 53 cooperates with the bracket 52 to complete the socket and to form a ball and socket joint constituting a universal coupling means between the forward end of a pusher bar 46 and the rake head 32. The opposite side of the rake head is provided with a similar universal coupling connecting the other pusher bar 46. It will thus be seen that the rake head 32 has relatively free movement with respect to the tractor body. The universal couplings facilitate this movement and are both desirable and practicable, because the rake head and tractor are carried on independent ground supports. Thus, the supporting wheels 43 of the rake head 42 may follow varying ground contour independently of the wheels 22 and 30 of the tractor. In addition, the universal coupling means at the forward ends of the pusher bars 46 freely permit the aforesaid tilting of the rake head 32 from ground-engaging position to raised or transport position.

It will be further noted that the pusher bars extend from points inside the rear wheels of the tractor to points outside the front wheels of the tractor. This arrangement provides for the connection of the pusher bars at their rear ends to the depending housings 27 and 29, and for the disposition of the forward portions of the pusher bars in such positions as to permit free steerability of the tractor front wheels 22.

According to the present invention, a means is provided for controlling the relative movement between the rake head and tractor. An important function of such means is the restraining of relative transverse movement between the rake head and tractor. A preferred embodiment of this means will be presently described. An intermediate portion of the tractor body 10, preferably at the forward end of the rear body part 11, is provided with a mounting or attaching pad 54. An arm 55 is pivoted at its rear end on this pad by means of a transverse pivot pin 56. This arm or member extends forwardly and downwardly and has its forward end disposed adjacent the rear frame bar 33 of the rake head. The arm thus is mounted for movement vertically with respect to the tractor body. As best shown in Figures 3 and 4, the axle supporting structure 17 at the forward end of the tractor body includes a rearwardly extending portion 57 which has transversely spaced supporting portions 58; these portions being disposed substantially under the forward end of the engine or power plant 13. To each of the supporting portion 58 is secured a bracket portion 59 of a downwardly extending or depending guide member 60. The guide members 60 are transversely spaced apart and are connected together at their lower ends by a transverse connecting means in the form of a bolt 61. The arm 55 extends between the guide members 60 and is free to move vertically in the space therebetween. The bolt 61 serves to limit vertical movement of the arm 55. It will thus be seen that the arm is confined between the guide members 60 against relative transverse movement, although a substantial range of unlimited vertical movement is permitted. This structure comprises part of the means for restraining relative transverse movement between the rake head 32 and the tractor.

The forward end of the arm 55, as best shown in Figure 4, is apertured at 62 and receives a vertically extending standard 63 in the form of a bolt rigidly carried by the rear frame bar 33 of the rake head. The upper end of the standard or bolt is threaded and receives a pair of adjustable nuts 64. A compression coil spring 65 encircles the standard 63 and is confined between the arm 55 and the nuts 64. The connection between the arm 55 and the rake head 32 serves to restrain relative transverse movement between the tractor and rake head. This result is achieved by the structure in which means are provided for preventing relative transverse movement between the rake head and the arm 55 and between the arm 55 and the tractor body. The connection between the arm 55 and the rake head is sufficiently flexible to permit vertical movement of the arm 55 with respect to both the tractor and the rake head. Hence, this connection does not interfere with the relatively free vertical movement between the rake head and tractor as varying ground contours are independently encountered by the rake head wheels 43 and the tractor wheels 22 and 30.

The arrangement of the standard 63 and the compression spring 65 provides another important feature of the invention. This feature consists of means for yieldably resisting tilting of the rake head 32 about the wheels 43. Compression on the spring 65 may be adjusted by the nuts 64 so that pressure is actually imparted to the rake head in a direction tending to urge the forward ends of the rake teeth 35 into ground-engaging position. This result follows from the action resulting from the expansion of the spring 65, which pulls the rear end of the rake head upwardly, thus forcing the forward end of the rake head downwardly. When a raised ground portion is encountered by the teeth 35, the rake head may tilt upwardly, resisted by the action of the spring 65. According to the particular size and shape of the variation in ground contour, and according to whether this variation is engaged by the teeth 35 or by the wheels 43, the rake head may either tilt about the wheels or may move vertically with respect to the tractor. In either event, the structure provides for necessary and desirable free floating movement of the rake head within rather wide limits.

The machine includes also means for raising and lowering the rake head from and to ground-engaging position. This position of the rake head is illustrated in Figure 2. The rear body part 11 pivotally carries a hand lever 66, the upper end of which is in proximity to the operator's station 31, and the lower end of which carries rigidly thereon a rearwardly extending arm portion 67. The rearward end of the arm 67 has pivotally connected thereto the rear end of an operating link 68, the forward end of which is pivotally connected to an upstanding arm 69. As best shown in Figure 3, the arm 69 is rigidly carried by a transverse rockable element or rock-shaft 70 journaled in the rear supporting portion 67 of the axle-supporting structure 17. The other end of the rock-shaft 70 carries an upstanding arm 71 similar to the arm 69. The arms 69 and 71 are pivotally connected by links 72 to an upper portion of the rack structure 36 of the rake head. The arms and links provide, in conjunction with the lever 66, means for effecting the tilting of the rake head. The arrangement of the linkage is such that the lever 66 is not locked while the rake head is in operating or ground-engaging position. Thus, the lifting means does not interfere with the floating movement of the machine. Rearward movement of the lever 66 operates the links 68 and 72 to move the rack structure 36 of the rake head rearwardly, thus tilting or pivoting the rake head about its transverse tilting axis through the wheels 43. The rake head then assumes the transport position, in which case the load carried by the rake head may be moved or transported as desired.

It will be seen from the foregoing description that the present invention provides certain fundamental features adapted to and useful in tractor-mounted sweep rakes. It will be understood, of course, that certain features of the invention are similarly applicable to other types of implement or machines, particularly machines the primary function of which is to move and carry material. It is to be further understood that various other alterations and modifications may be made in the preferred construction illustrated without departing from the spirit and scope of the invention as defined in the appended claims.

What is claimed is:

1. A vehicle-mounted load-moving machine comprising a vehicle having a longitudinal body, a wheel-supported load-carrying frame at the front of the vehicle, means including universal coupling means connecting the vehicle and frame for relative vertical movement, second means connecting the frame and vehicle body and including a member extending longitudinally of the body and movable vertically with respect to the body, and means carried by the body for guiding the member and for restraining the member against transverse movement relative to the body.

2. A vehicle-mounted load-moving machine comprising a vehicle having a longitudinal body, a load-carrying frame at the front of the vehicle, means including universal coupling means connecting the vehicle and frame for relative vertical movement, second means connecting the frame and vehicle body and including a member extending longitudinally of the body, means movably connecting the member to the body for movement of the member vertically with respect to the body, means movably connecting the member and frame for relative vertical movement and including yieldable means for restraining said movement, and means carried by the body for guiding the member and for restraining the member against transverse movement relative to the body.

3. A vehicle-mounted implement comprising a vehicle having a longitudinal body, a supporting structure on the body including a transverse pivot element and a vertically disposed guide means, an implement, means connecting the body and implement for relative vertical movement, means carried by the vehicle for moving the implement vertically and including the aforesaid pivot element, and second means connecting the implement and vehicle body to restrain relative transverse movement therebetween and including a member cooperating with the aforesaid guide means.

4. A vehicle-mounted load-moving machine comprising a vehicle having a longitudinal body, a load-carrying frame, means mounting the frame for vertical movement with respect to the vehicle from a ground-engaging position to a raised position, means for guiding the vertical movement of the frame and for restraining relative transverse movement between the frame and vehicle body and including a member movably connected between the frame and vehicle body and a vertically disposed guide element carried by the vehicle and engaging the aforesaid member, and yieldable means connected between the member and the frame for yieldably urging the frame to ground-engaging position.

5. In combination, a tractor having a longitudinal body, a bracket at one end of the body and including a transverse rockable element, a pair of transversely spaced guide members depending from the bracket, a bar pivoted at one end to the tractor body and extending longitudinally between the guide members, a load-carrying frame at one end of the tractor, means connecting the frame and the bar, whereby the frame has vertical movement relative to the tractor, means connecting the frame and rockable element, and means carried by the tractor for movement with respect thereto and operatively connected to the rockable element for adjusting the frame vertically.

6. A tractor-mounted sweep rake comprising a tractor, a rake head at the front of the tractor and including a pair of transversely extending, parallel, front and rear frame bars, a pair of ground supports carried respectively at opposite ends of the front frame bar, means connecting the tractor and rake head and including a frame movably connected to the tractor and having a pair of transversely spaced members disposed with their forward ends adjacent the rake head, and means including universal couplings connecting the forward ends of said members respectively to opposite ends of the rear frame bar of the rake head.

7. A tractor-mounted sweep rake comprising a tractor, a rake head at the front of the tractor and including a pair of transversely extending, parallel, front and rear frame bars, means connecting the tractor and rake head for relative vertical movement and including a pair of transversely spaced members extending respectively at opposite sides of the tractor, means including universal couplings connecting said members respectively to opposite ends of the rear body of the rake head, means movably connecting the rear ends of said members to the tractor, a pair of ground wheels carried respectively at opposite ends of the front bar of the rake head, whereby the rake head may have tilting movement about a transverse axis through said wheels with respect to the tractor and aforesaid members, and means connected between the tractor and the rear bar of the rake head for yieldably resisting tilting of the rake head.

8. In combination, a tractor having a longitudinal body carried on front and rear axles having laterally spaced wheels, the longitudinal center line of the body being laterally offset to one side of the longitudinal center line through the axle, a load-carrying frame forwardly of the front axle, a pair of laterally spaced frame members disposed respectively at opposite sides of the body, means pivotally connecting the rear ends of the members to the tractor, means pivotally connecting the front ends of the members to the frame, a longitudinally extending member disposed at one side of the tractor body generally on the center line through the axles, means connecting said members and tractor for relative vertical movement, and means connecting said member and the load-carrying frame.

9. A load-carrying structure for a load-moving machine comprising a pair of parallel, transverse frame members arranged generally in the same horizontal plane, opposite end portions of one member being extended vertically upwardly and then outwardly to provide a pair of transversely spaced supporting portions disposed at a level above the plane of the members, bracing members between said portions and the other member, load-carrying elements carried by the frame members, and a pair of swiveling ground supports carried respectively by the aforesaid supporting portions.

10. A rake head structure for a sweep rake comprising a pair of transversely spaced caster wheels each having a vertical spindle, a rake head frame cradled between said wheels and including a transverse frame member having opposite, upper end elements respectively swiveling the caster wheel spindles and an intermediate transverse portion spaced below the end elements and in proximity to the ground, said member including a pair of connecting portions respectively between the transverse portion and the end elements, each of said portions being inclined downwardly and inwardly from the respective end element to provide space for the swiveling of the respective caster wheel, a second transverse frame member paralleling the transverse intermediate portion of the first frame member, rake teeth carried by the frame members, and brace means connecting the end elements of the first member respectively to end portions of the second member, said bracing means being shaped to permit free swiveling of the caster wheels.

SAMUEL E. HILBLOM.